Jan. 28, 1964 J. P. KEALY ETAL 3,119,683
HIGH NITROGEN COMPLETE MIXED FERTILIZERS
Filed March 10, 1960
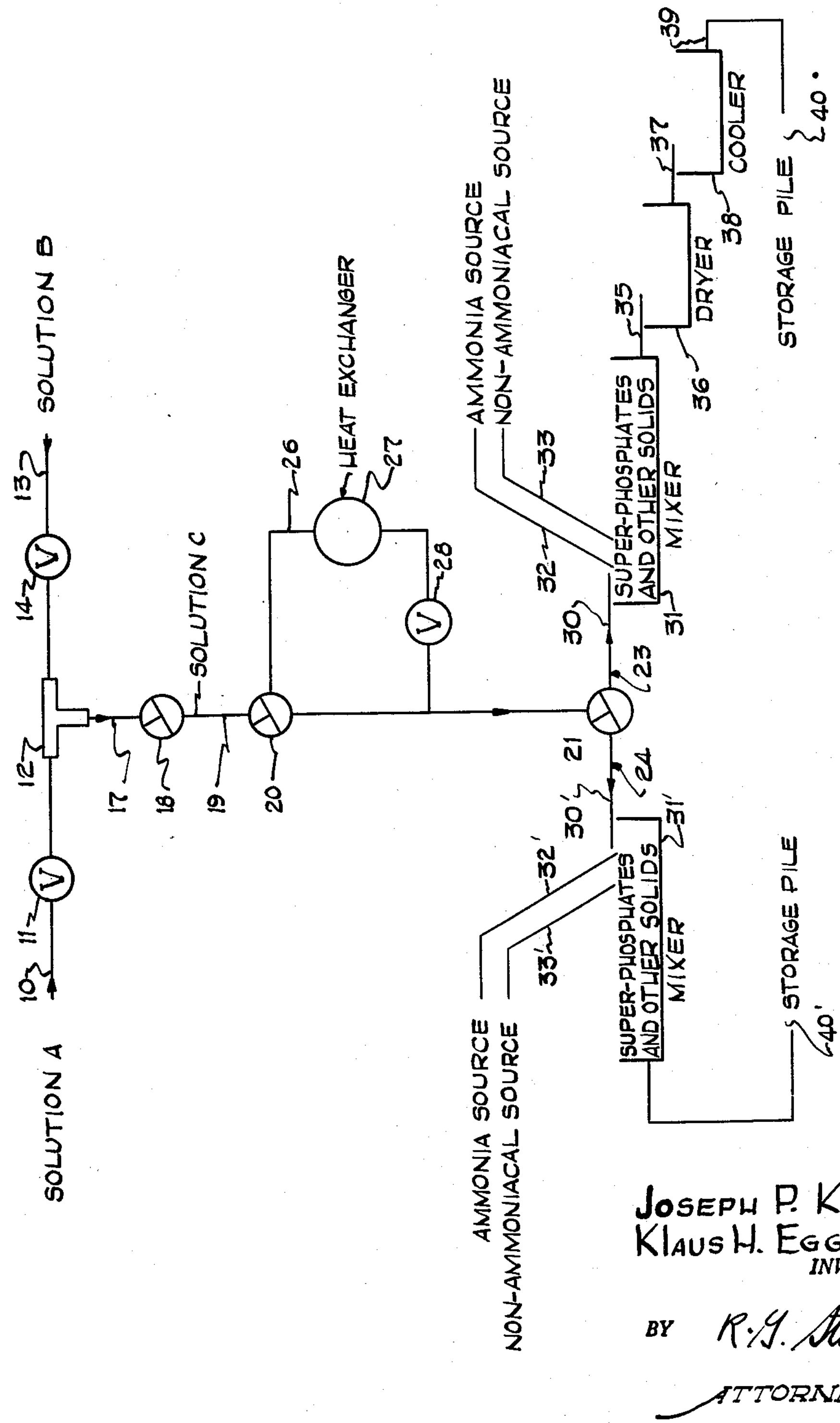

United States Patent Office 3,119,683

Patented Jan. 28, 1964

1

3,119,683
HIGH NITROGEN COMPLETE MIXED FERTILIZERS

Joseph P. Kealy and Klaus H. Eggers, Calumet City, Ill., assignors to Swift & Company, Chicago, Ill., a corporation of Illinois Filed Mar. 10, 1960, Ser. No. 14,126
8 Claims. (Cl. 71—29)

The present invention relates in general to preparation of a mixed fertilizer product containing urea-formaldehyde condensation products. More specifically, the invention is directed to a process for preparing free-flowing mixed fertilizers containing ureaform under conditions such that an improved product with high available nitrogen content is formed.

It is the aim of most fertilizer manufacturers to produce a mixture of fertilizer materials having large amounts of nitrogen in agronomically available form. To this end, phosphatic materials, such as superphosphate and triple superphosphate, are often treated with ammoniacal substances, such as anhydrous ammonia, aqua ammoni, solutions of urea and of ammonium nitrate, etc. Such ammoniation increases the nitrogen content of the phosphates. Certain salts which contain nitrogen in an agronomically available form can be added to, or produced in, superphosphate mixtures. Particularly suitable as a source of nitrogen in fertilizer mixtures—either alone or in conjunction with other nitrogen-supplementing materials—is the class of resinous materials known, interchangeably, as "urea-formaldehyde condensation products," "ureaform," or "water-insoluble urea-formaldehyde polymers." These terms apply to the acid catalyzed reaction product of urea and formaldehyde having a mol ratio of urea to formaldehyde of at least 1 to 1. The product contains nitrogen in a water-insoluble but slowly available form; and is therefore not leached out in the soil immediately following application to growing plants. A further advantageous feature of the water-insoluble ureaform polymer as a nitrogen source in fertilizer mixtures is in the fact that it shows no tendency to burn plant leaves through plasmolysis. Many of the commonly used fertilizer salts effect a burn or discoloration and a debilitation of plants when applied thereto. A discussion of which chemical sources of nitrogen cause plasmolysis will be found in United States Patent No. 2,827,368, Everett N. Mortenson et al. issued March 18, 1958, entitled "Non-Burning Plant Fertilizer."

A commonly employed procedure for manufacturing fertilizer containing ureaform has been to first condense the urea and formaldehyde in an aqueous solution (for example in the manner detailed by Clark et al. in Ind. and Eng. Chem., vol. 40, p. 1, 178 (1948)) and subsequently admix the resin so formed with additional fertilizer solids, such as superphosphates (usually ammoniated), potassium nitrate, potassium sulfate, ammonium nitrate, potassium chloride or any of the commonly utilized fertilizer ingredients.

Another method for incorporating ureaform in a mixed chemical fertilizer is to form the product in situ when formulating the fertilizer mixture, and preferably at the time when superphosphates are being ammoniated. In this procedure urea is charged into a chamber containing superphosphates and a source of formaldehyde is injected into the chamber. The acidity of the phosphatic substrate and the heat therein initiates the urea-formaldehyde condensation reaction in the mixing chamber. The heat from the exothermic neutralization reaction which occurs if the superphosphates are simultaneously being ammoniated also aids continuation of the condensation reaction (which is exothermic itself). When forming water-insoluble urea-formaldehyde polymers in situ, the pH of the substrate, product temperature, and mol ratio of urea to formaldehyde dictate the quality of the polymer formed with respect to its nitrogen availability and, therefore, its agronomic usefulness. The importance of these variables and their interrelationship are disclosed and explained in U.S. Patent No. 2,955,930, issued October 11, 1960, to Joseph P. Kealy, the disclosure of which is incorporated herein by reference.

2

One problem that arises when preparing the urea-formaldehyde condensation products in situ by spraying a source of formaldehyde into a phosphatic substrate containing urea is the large amount of free urea remaining in the finished product—often above 10% of the total urea. Uncondensed, or free, urea tends to burn leafy plants when applied thereto. In this regard we have found that no more than about 10% of the total urea should be uncondensed. Free urea also provides urea in a soluble form rather than the desirable water-insoluble but slowly available form. In this form the urea nitrogen is readily leachable, and some nitrogen may be lost from the fertilizer by liberation of ammonia. A further disadvantage of large amounts of free urea is in the fact that it is indicative that the urea-formaldehyde condensation has not been at the mol ratio chosen with the result that, other variables (such as pH and temperature) being constant, ureaform will be prepared whose availability index is less than that sought. The presence of free urea is due to the fact that the urea must be in aqueous solution to react with the formaldehyde and sufficient water is not available in the system (if a dry mixed fertilizer is to be prepared) to put the urea in solution. It is not considered practicable to add a urea solution per se to the solids because a highly saturated solution must be kept at exceedingly high temperatures to prevent the urea crystallizing out of solution. The added heat together with heats of reaction makes production of a fertilizer product containing ureaform of high availability index difficult. Since one of the difficulties in producing high availability index ureaform in the presence of a phosphatic substrate is the problem of heat removal, it is apparent that a system where heat is added is not desirable. A less saturated urea solution need not be introduced at the very high temperatures required in the highly concentrated solutions, but the increased amounts of water cause formation of an undesirable thick slurry rather than a final dry discrete mixture. Furthermore, separate injection of liquid urea and formaldehyde does not produce intimate mixing and reaction between the components; some of the urea will salt out and again the problem of undesirable amounts of free urea occurs.

An object of our invention is to eliminate the above mentioned problems by providing an improved method for introducing urea and formaldehyde into solid fertilizer ingredients such that only small amounts of free urea (about 10% or less of the total urea) remain in the resultant fertilizer mixture and large amounts of ureaform of high availability index are formed.

An additional object of our invention is to provide a method whereby a greater percentage of the urea is condensed than is generally possible with present processes that prepare urea-formaldehyde condensation products in situ.

Still another object of our invention is to provide a method whereby the curing time required to polymerize the urea-formaldehyde reaction products to the desirable water-insoluble resinous form can be substantially reduced while maintaining an availability index of the water-insoluble resin of at least about 40.

As has been mentioned (and as is discussed more thoroughly in the aforementioned Patent No. 2,955,930), the temperature of the fertilizer mixture containing ureaform is an important factor in producing an agronomically useful product. The first 24 hours' cure after formulation of the mixed fertilizer is the most critical period since the rise in fertilizer pile temperature during that period is rapid and substantial, leveling off after the first day in storage. It is important that the pile temperature after the critical 24-hour period be no higher than about 164° F. and this temperature is safe only if high pH and urea to formaldehyde mol ratio are used. If the pH of the mixture is on the lower end of the range 3.0 to 6.5 and/or the urea to formaldehyde ratio is closer to equimolar than the up to 2.75 to 1 ratio that is practicable, the temperature of the pile after the first 24 hours may have to be substantially less than 164° F., and as low as about 75° F. in order to produce agronomically useful ureaform nitrogen of availability index no less than about 40.

The problem of controlling temperature becomes more acute as greater amounts of ureaform nitrogen are prepared in a fertilizer substrate to produce fertilizer products having large percentages of nitrogen. This is due to the exothermic nature of the condensation reaction between urea and formaldehyde.

Since temperature control is extremely important, it will be appreciated that a method whereby temperature could be controlled prior to entry of the fertilizer product into storage (the "cure" period) would be a desirable advance in the fertilizer manufacturing industry. This would eliminate the necessity for adjusting the temperature of the product such as by physically moving the pile which often amounts to 100–500 tons of product. Moving such a mass of product necessarily involves expenditure of time and labor, and necessitates extra space requirements. An additional, and principal, object of our invention is to provide such a temperature control. Our temperature control allows for continuous processing since there is no need to rehandle or otherwise remove heat from the finished mixed fertilizer once it has exited the batch or continuous system equipment. It also provides a method for producing higher nitrogen content products with less exacting control of pH and mol ratio. It gives greater flexibility to the method since all of the variables can be controlled initially without the necessity for subsequent adjustment.

Further objects and advantages will become apparent to one skilled in the art from the following description of the invention taken in conjunction with the drawing which is a diagrammatic representation of a method for preparing and introducing urea and formaldehyde solution of our invention, showing its adaptability to either continuous or batch processing, or both.

We have discovered that the addition of a particular solution containing urea and formaldehyde in the proportions desired in the final mixed fertilizer product can be introduced into a zone containing substantially solid fertilizer materials, such as superphosphates, mono, di, and tribasic, metaphosphates, and other mono and diphosphates, ammonium salts, potash, etc., as wall as fertilizer bulking materials if desired, to thereafter form water-insoluble urea-formaldehyde condensation products which are not overcondensed but rather have a larger amount of ureaform nitrogen in agronomically available form than it has heretofore been possible to produce with an in situ ureaform preparation. It should also be noted that our process for introducing urea and formaldehyde can be used to add additional ureaform nitrogen to a solids substrate already containing some ureaform. In this fashion even higher nitrogen content products could be produced.

It is postulated that the solution at the time of addition to the phosphatic substrate in a fertilizer mixing zone is primarily a monomeric solution of methylol ureas and methylene ureas, has a pH above about 6, and contains 25% or less water. The mol ratio of urea to formaldehyde in the concentrated solution is from 1:1 to 2.75:1, with perhaps 1.5:1 to 2:1 being optimum. It should have a temperature of about 30° F. or more, and can be as hot as about 250° F. A solution conforming to these specifications will be known throughout this specification and the appended claims as "urea-form solution." The solution will contain sufficient water to solubilize all the urea incorporated therein at least by the time the fertilizer product exits the mixing zone, and the reaction products (methylol and methylene ureas) will be sufficiently soluble so as to be pumpable. It will, therefore, be apparent that it will contain at least about 10% water.

The highly concentrated urea-form solution to be added to the fertilizer solids is prepared by mixing a source of urea with a source of formaldehyde in such a manner that there is substantially no loss of reactants, no formation of water-insoluble ureaform resin therein, and substantially none of the ingredients is umcombined—i.e., the urea and formaldehyde are reacted but solidification has not occurred.

An example of the method of preparing the concentrated urea-form solution is as follows:

A saturated solution of urea and water is prepared, as for example by dissolving urea in water in proportions of 75—95% urea and 25—5% water, respectively. The solution of urea and water must be kept above the crystallizing temperatures of urea (i.e. above about 160° F. for 75% urea solution and above about 245° F. for 95% urea solution), but should not be held at a temperature above the point where excessive breakdown of the urea to ammonia and carbon dioxide occurs. For example, an 85%, by weight, aqueous urea solution liberates considerable ammonia when heated above 220° F. The preferred temperature of the concentrated urea solution for ease of operation is 5°–10° F. above the temperature at which it crystallizes out.

A commercially available alkaline solution known as "UF–85," containing approximately 61% formaldehyde, 24% urea and 15% water, is a particularly suitable source of formaldehyde. The formaldehyde source should be kept at a temperature below that at which it will polymerize by itself and above that at which it becomes difficult to pump and is not readily miscible with the hot urea solution. For UF–85 solution the temperature range is between about 40°–140° F., with perhaps about 110° F. being optimum (at 40° F. its viscosity is 1000 centipoises as compared to 150 centipoises at 90° F.).

The hot saturated urea solution and the solution (preferably heated) containing formaldehyde are then thoroughly mixed together in proportions such that the mol ratio of urea to formaldehyde in the resulting solution will be between 1.0 and 2.75 to 1 and the water content will be 25% or less and preferably about 12–18%. Before adding the mixture so formed to the acidic fertilizer solids it should be allowed to react for a period sufficient to form the urea-form solution containing methylol ureas but insufficient to cause formation of a water-insoluble resin therein. The urea-form solution thus formed will, and should have a pH above about 6 and preferably in the range of 6.8–7.2. The temperature of the mixed solutions will rise due to the exothermic nature of the reaction between urea and formaldehyde. Therefore the urea-form solution will likely have a temperature in excess of about 170° F. and up to as bigh as about 250° F.

The reason we prefer to heat the formaldehyde source is that the reaction proceeds more quickly. Thus, while UF–85 is miscible with water and a concentrated urea solution, it will not mix well when cold merely by flowing into or with the urea solution in a pipe line. However, at higher temperatures, e.g. 100°–120° F., it will mix and also react with the urea, forming the urea-form solution and producing heat.

The reaction period (after mixing the saturated urea solution and solution containing formaldehyde) to form the urea-form solution normally will be about 30 seconds to one minute, time depending on concentration and temperature of the urea solution and temperature of the formaldehyde source. After the urea-form solution has been prepared in the manner just explained, it can be held at the reaction temperature (180°–230° F. with an 82.5% urea solution mixed with UF–85 to provide a 1.9 U/F mol ratio) for about 45 minutes to an hour before excessive precipitation of water-insoluble resin prevents pumping of the solution. The urea-form solution can be cooled and held for an additional period of time without encountering excessive water-insoluble resin formation. This additional holding period depends upon concentration, reaction temperature, and how long the mixture is held at the reaction temperature before cooling. In certain cases it is possible to hold the solution for an hour or more. Generally it is possible to hold the solution for a longer period if it is cooled substantially immediately after the 30–60 second reaction period. It is also generally possible to cool the solution to lower temperatures if the initial urea-formaldehyde reaction temperature is on the lower end of the 170°–250° F. range, e.g. 170°–210° F., and if cooling is carried out substantially immediately after the reaction period. For example, a urea-form solution having a reaction temperature below about 200° F. can be cooled below about 30° F. before water-insoluble resin formation occurs; whereas, if the reaction temperature is 220°–250° F. the solution cannot be cooled much below 100° F.

Table I gives illustrative holding times for an 82.5% urea solution mixed with UF–85 in proportions such that a 1.9 U/F mol ratio results.

TABLE I

| U–F Reaction | | Cooling Conditions | | Condition of Mix After Holding for Time Indicated |
|---|---|---|---|---|
| Mix Temp., ° F. | Time, Min. | Cooled to ° F. | Holding Time, Min. | |
| 180–220 | .5 | 95 | 1 | Viscous but pumpable. |
| 180–220 | .5 | 75 | 1.5 | Do. |
| 180–220 | .5 | 70 | 2 | Froze solid as urea crystallized out. |
| 180–205 | 15 sec. | 130 | 20 sec. | Urea crystallized out. |
| 180–205 | 1 | 100 | .75 | Clear watery liquid. |
| 180–210 | 1.5 | 110 | .5 | Liquid. |
| 180–207 | 2 | 160 | 20 sec. | Do. |
| 180–207 | 2 | 120 | 35 sec. | Do. |
| 180–207 | 2 | 102 | 50 sec. | Do. |
| 211 | 2 | 100 | 6 | Clear watery liquid. |
| 212 | 2 | 120 | 6 | Do. |
| 212 | 2 | 120 | 8 | Do. |
| 212 | 2 | 120 | 60 | Liquid. |
| 230 | 5 | | | Cloudy liquid. |
| 230 | 13 | | | Liquid. |
| 230 | 20 | | | Viscous but pumpable. |
| 230 | .5 | 160 | 60 | Cloudy liquid. |
| 230 | 2.5 | 160 | 7 | Do. |
| 230 | 2.5 | 160 | 25 | Viscous but pumpable. |
| 230 | 5 | 160 | 2 | Do. |
| 230 | 5 | 160 | 15 | Do. |
| 230 | 10 | 160 | 1 | Do. |
| 230 | 10 | 160 | 6 | Do. |
| 230 | 2.5 | 120 | 7 | Cloudy fluid. |
| 230 | 2.5 | 120 | 25 | Viscous but pumpable. |
| 210 | 10 | | | Cloudy liquid. |
| 210 | 30 | | | Liquid. |
| 170–210 | .95 | 60 | | Pumpable (cloudy). |
| 210 | 43 | | | Liquid. |
| 195–200 | 30 sec. | 30 | 24 hours | Clear fluid. |

The urea-form solution should be introduced to the fertilizer solids before water-insoluble resin formation occurs therein and before it becomes too viscous to pump. The foregoing table will serve as a partial guide as to hold-up times prior to introduction to the acidic fertilizer solids. A maximum hold-up time from preparation of the urea-form solution to entry thereof into the fertilizer solids of about 20 minutes is preferred. At lower temperatures and mol ratios and concentrations that are not severe, the hold-up time can be increased substantially, for example at 120° F. solid ureaform does not begin to appear in the solution for about 2–4 hours.

From the above description of the urea-form solution and its method of preparation, it will be apparent that batches of the solution can be prepared and held for a period of time, or, alternatively and preferably, the urea-form solution can be prepared continuously as needed and substantially immediately metered into a fertilizer mixer (batch or continuous system) in the amount required to produce the desired amount of ureaform nitrogen in the finished mixed fertilizer. Those skilled in the art will see that it is substantially more practical from an operational standpoint to prepare the urea-form solution continuously as needed and introduce it substantially immediately to the acidic substrate. For example, by operating continuously, if a stoppage should occur in production, hold-up time and the possibility of forming an unpumpable solution whose reactants have polymerized to the water-insoluble resin is not a problem.

The formaldehyde source is preferably a concentrated methylol urea solution having a mol ratio of formaldehyde to urea substantially greater than 1 to 1. Examples are the commercially available product containing approximately 24% urea, 61% formaldehyde and 15% water known under the trade designation "UF–85," and a product containing about 20% urea, 51% formaldehyde and 29% water known under the trade designation "UF–71." Other formaldehyde sources can be used provided it is possible to produce therewith a solution of urea and formaldehyde reaction products in the mol ratio of 1.0–2.75 mols urea to 1 mol formaldehyde, said solution containing no more than about 25% water.

By following our procedure for incorporating urea and formaldehyde in substantially dry fertilizer solids, it is also possible to control the temperature of the mixed fertilizer product so that it will exit from the fertilizer mixer at a sufficiently low temperature that adjustment of temperature during or after the crucial temperature rise period (the first 24 hours of storage) is not required to obtain a product containing extremely large amounts of ureaform nitrogen of high availability index, i.e. not less than 40. We have found that heat can effectively be removed from the mixed fertilizer product by removing it from the urea-form solution containing the unpolymerized urea and formaldehyde reaction products prior to introducing that solution to the fertilizer solids substrate. For example, in preparing a 12–5–7 grade fertilizer having 10.5 units of ureaform nitrogen, a drop of 5° F. in the solution temperature will lower the product temperature about 4° F. In this grade of product there is approximately 720 lbs./ton ureaform liquid per 1300 lbs./ton solids. In a 16–8–4 grade fertilizer where there is about 940 lbs./ton ureaform liquid per 1060 lbs./ton solids, a 5° F. temperature drop will lower the product temperature about 5° F.

Since the urea-form solution salts out to a thick viscous mush at 30°–120° F., depending on mol ratio used, temperature and length of reaction, it is not feasible to lower the temperature of this solution below about that temperature. However, when it is remembered that each degree F. of heat taken out will remove .8°–1° F. heat in the final product and that the solution temperature is originally about 170°–250° F. or more, it is seen that at least about 40°–220° F. can be removed from the product in this fashion. This will amply compensate for the 25°–80° F. rise during the first 24 hours in the storage pile. (It should be noted that the expected temperature rise of the pile in the first 24 hours varies directly with the amount of ureaform nitrogen fixed in the product.) For example, a product containing 10.5 units solid ureaform nitrogen will rise about 40°–50° F.; a product containing 14.25 units solid ureaform polymer (16–8–4 grade product) will rise about 60°–80° F. We prefer to cool the solution sufficiently that product enters storage at 50°–100° F. Cooling the solution to about 100° F. will normally be sufficient.

Heat can be removed from the urea-form solution by means of any conventional type heat exchanger, such as a simple concentric pipe type unit wherein the fluid to be cooled is passed through one pipe and coolant is circulated through the other. Also illustrative of a type of heat exchanger usable in our method is one known under the trade designation "Helioflow." We have found it preferable when maximum cooling is desired to use a heat exchanger having a high velocity flow. The high velocity flow helps to prevent a film of urea-form solution from forming on the heat exchanger walls. Obviously, film formation retards heat transfer. For example, we have found that at a flow rate of 7 feet/minute a 230° F. solution will form films of 1/16" to 1/8" and that after three hours running at this flow it was impossible to cool the solution below about 155° F. It is also preferable to cool the urea-form solution as soon as possible after it is formed. Any substantial holding period before cooling produces a higher viscosity. It is more difficult to cool a viscous solution. It is also desirable that the heat exchanger used be of a type that will allow all volumes of the exchanger to be positively displaced by new increments of flow of urea-form solution or—when washing out—of water.

It is possible that it would not be necessary to remove heat from the urea-form solution in order to cause the fertilizer product to enter storage at a temperature sufficiently low that the temperature rise will not raise the product temperature above the safe storage temperature which, when correlated with mol ratio and pH will insure a fertilizer containing solid ureaform polymer having not less than 40 A.I. Factors which have a bearing upon the product storage entry temperature are: (1) outside temperature; (2) the cooling capacity of the system (i.e. batch vs. continuous, continuous systems removing about 50°–75° F. from the product during the drying and cooling phases of the system); (3) the reaction temperatures within the fertilizer mixer (i.e. ammoniation if carried out, and the urea-formaldehyde condensation reaction), (4) the temperature of the urea-form solution containing the unpolymerized urea and formaldehyde reaction products, and (5) the amount of ureaform nitrogen to be incorporated by this method into the final product. It may well be that the conditions under which one is working (e.g. production of relatively low nitrogen content product by a continuous process on a rather cool day using pH and mol ratio that will allow final storage temperature at the upper end of the 75°–164° F. range) will be such that the temperature of the urea-form solution need not be lowered. Nevertheless, it is apparent that this aspect of our invention allows for much greater flexibility in selecting mol ratios and pH and allows for complete temperature control at any variable chosen and in whichever type system (batch or continuous) is employed.

When our method for injecting the urea and formaldehyde into a phosphatic substrate is followed, the urea-form nitrogen has an availability index (A.I.) as that term is defined by methods published in the 1955 Ed. Official Methods of Analysis, Association of Official Agricultural Chemists, page 14, paragraph 2.32 and page 16, paragraphs 2.37 and 2.38, of at least 40 percent. Due to the increased flexibility in choosing variables (since temperature can be accurately controlled in the system), it is possible, following our method, to produce a product having an A.I. substantially above 40 and often above about 50 without using extremes of pH and mol ratio control. Also large amounts of ureaform nitrogen of high A.I. can be incorporated in the fertilizer according to our method while still preparing a free-flowing complete mixed fertilizer.

The mixed fertilizer is normally kept in a storage pile for a period of time of between about 1–3 weeks before it is bagged and sold. This period (often referred to as the "cure" period) is required to allow the fertilizer to become relatively stable. For example, during this period (and especially the first 24 hours thereof) the urea-formaldehyde condensation reaction will be continuing until substantially all of the urea and formaldehyde reaction products polymerize to the desirable water-insoluble resinous form. Since substantially all of the urea and formaldehyde have reacted to the extent of forming the monomeric urea-form solution prior to entering the zone containing the acidic substrate and all that remains to be accomplished in storage is completion of the polymerization to the water-insoluble resin, it is possible to substantially reduce curing time with our process while maintaining the availability index of the water-insoluble resin at least about 40. We have found that by following our method the product can be fully cured in as little as about eight hours.

Referring to the figure, solution A (the hot concentrated urea solution) passes through conduit 10 and is metered through valve 11 to mixing T 12. Solution B (the solution containing formaldehyde, and preferably UF–85 and preferably heated) passes through conduit 13 and is metered through valve 14 to mixing T 12. Valves 11 and 14 are controlled so as to meter sufficient solution A and solution B, respectively, to T 12 to maintain a mol ratio of urea to formaldehyde in the resultant mix of about 1 to 1 up to about 2.75 to 1. The mixture of solutions A and B exits T 12 into conduit 17. Length and size of pipe and flow rate controls the amount of time the mixture remains in line 17. The period in line 17 should be sufficient to combine the urea and formaldehyde but not sufficiently long to polymerize the reaction products and normally about 30 seconds to one minute. For example, 70' of 2" pipe gives about a one minute reaction time in line 17 when the flow rate is 15 gallons per minute at 12 tons per hour of fertilizer produced. Three-way valve 18 can be used to divert the solution to a holding unit (not shown) to clear lines 10, 13 and 17 if necessary. If not diverted, the mixture of solutions merely passes through valve 18 into line 19.

At this point (i.e. when the urea-form solution exits valve 18) its temperature will be in the neighborhood of 170° to 250° F. If the urea to formaldehyde mol ratio, pH to be made in the fertilizer mixer, the amount of urea-form nitrogen, and the outside temperature are such that solution at this temperature can be introduced into the fertilizer solids and still obtain a safe product storage temperature after the first 24-hour period, or, if facilities are such (i.e. space, labor, etc.) that the storage pile can be moved to cool it if the temperature is prohibitively high, solution C can be metered (before water-insoluble ureaform commences to apear in the solution and before viscosity increases to a degree that it is not pumpable) through 3-way valves 20 and 21 directly into either, or both, the continuous fertilizer mixing system generally 23 or the batch system generally 24. The valves are controlled to meter in sufficient solution to provide the desired number of ureaform nitrogen units. If it is desired to get greater flexibility of variables in the system, the temperature of solution C can be lowered by positioning 3-way valve 20 to divert the solution from line 19 to line 26 and into heat exchanger 27. When the solution has been cooled to the desired degree (30°–160° F.) valve 28 will allow it to exit into line 19 where it can pass through valve 21 as previously mentioned.

If solution C passes through valve 21 and into continuous system 23 it is channeled first through line 30 into a conventional fertilizer mixer 31. Mixer 31 contains substantially solid fertilizer ingredients such as superphosphates, potassium nitrate, potassium sulfate, etc., and may contain substantial amounts, by volume, of bulking materials such as soyabean hull meal, rice hulls, peanut hulls, corn cob fraction, perlite, vermiculite, etc. These bulking agents provide the additional advantage of allowing formation of a free-flowing mixed fertilizer without a recycle or drying operation even at the relatively high ratio of liquid to solids used when incorporating large amounts of solution C into the system.

Line 32 indicates an ammonia feed to be used if the superphosphates are to be ammoniated; 33 indicates a line for feeding in a nonammoniacal base that can be used in conjunction with the ammonia if it is desired to form a non-burning fertilizer. In forming a nonburning product, only sufficient ammonia to satisfy the stoichiometric requirements for converting the free phosphoric acid and monocalcium phosphate of the superphosphates to monoammonium phosphate and dicalcium phosphate is used. Of course, when forming a non-burning product the acidic substrate should not contain plasmolysis-producing nitrogenous materials (reference is again made to Mortenson Patent No. 2,827,368). The pH is then adjusted to that desired by addition of a nonammoniacal base. Any soluble basic material (other than an ammoniacal material) that does not react with any of the other ingredients present in the mix to form a burning compound is suitable to raise the pH. Some examples are the alkali metal and alkaline earth metal hydroxides that are nontoxic to plants. Preferably calcium hydroxide, potassium hydroxide, calcined dolomite, or magnesium oxide are used. Addition of a nonammoniacal base to adjust the pH in the mix is set out in more detail in the aforementioned Kealy application. If it is not desired to ammoniate the superphosphates, the nonammoniacal base can be used alone to adjust the pH upwardly to within 3.0–6.5.

Due to the heat and acid pH in the mixer 31, water-insoluble ureaform resin will begin to form therein after solution C is injected. The mixture, preferably ammoniated, and containing the urea and formaldehyde is then channeled through line 35 into dryer 36 where additional water is driven off of the product and is cooled and it is then passed through line 37 into cooler 38 to further lower the temperature of the product. The mixed fertilizer exits the cooler at 39 and is placed in a storage pile, as at 40.

As is shown in the drawing, this system can also be used to channel solution C from line 30′ into the batch system comprising mixer 31′, ammonia source 32′, and nonammoniacal base source 33′. In the batch system the mixed fertilizer exits directly from the mixer to the storage pile 40′ without any recycling or cooling operations. It is seen that in certain installations it would be possible to feed solution C to both types of systems at the same time, the solution being continuously prepared by mixing solutions A and B, which solutions can be previously prepared and stored, or (particularly in the case of solution A) can be prepared continuously when needed. For example, an 80% urea solution can be prepared by placing about 40 pounds of hot water in a tank and, with live steam purging into the tank, adding 1384 lbs. of urea. The mixture should be heated to about 200° F. The solution thus formed can be introduced into line 10. Urea, steam and water can be continuously fed into the tank to keep the 200° F. temperature and 80% urea concentration. The approximate flows for producing such an 80% urea solution at 20 tons per hour flow through the system are: 150 lbs./min. urea, 22 lbs./min. steam and 16 lbs./min. water. The following list will illustrate the temperature at which various preferred concentrations of urea will start to crystallize:

| Percent urea in solution— | Temperature at start of crystallization, ° F. |
|---|---|
| 88 | 212 |
| 85 | 198 |
| 83 | 189 |
| 82.5 | 187 |
| 80 | 176 |
| 77 | 164 |

It is, therefore, seen that a continuous method for forming solution A when needed is more practical than preparing it beforehand and holding it at high temperatures in order to prevent the urea from crystallizing out.

*Example I*

In this example a mixed fertilizer containing approximately 12 units of nitrogen, 5 units of phosphorus calculated as $P_2O_5$ and 7 units of potassium calculated as $K_2O$ was prepared as follows:

The following solids with the noted N-P-K values were charged into a conventional rotary type fertilizer mixer:

| Solid feed— | lbs./ton |
|---|---|
| Triple superphosphate (0–46–0) | 229 |
| Potassium nitrate (13.5–0–46) | 43 |
| Potassium sulfate (0–0–52) | 200 |
| Hydrated lime | 20 |
| Nel (minor element base) | 10 |
| Soya bean hull meal (1.7–0–2) | 775 |

A concentrated urea solution maintained at 190°–200° F. and containing approximately 420 lbs./ton urea (45–0–0) and 105 lbs./ton water was mixed with 204 lbs./ton UF–85 (11.1–0–0), 61% formaldehyde. The UF–85 solution had a temperature of 70° F. After about one minute the resultant urea-formaldehyde-water solution (having a U-F mol ratio of 1.9 to 1, approximately 18.6% water, and a temperature of 170°–180° F.) was added to the mixer containing the solids. While the solution was added, approximately 17.4 lbs./ton anhydrous ammonia (82.35–0–0) was injected to ammoniate the superphosphates. The pH in the mixer was 5.9. After tumbling in the solids bed for a period of time the fertilizer exited at 160° F. into a dryer where it was again tumbled for a period of time. The product exited the dryer at 130° F. and entered a cooler from which it exited at 90° F., entering the storage pile at that temperature. It is seen that substantial heat is removed from the mixed fertilizer product when put through the above type of continuous process. The tonnage rate of the fertilizer through this system was 20 tons per hour.

Table II lists the storage pile temperatures of the fertilizer product made in the foregoing manner:

TABLE II

| | ° F. |
|---|---|
| Storage entry | 90 |
| 4 hours old | 99 |
| 8 hours old | 116 |
| 16 hours old | 125 |
| 24 hours old | 139 |
| 2 days old | 141 |
| 3 days old | 141 |
| 4 days old | 141 |
| 12 days old | 140 |

From this data it can be seen that the final storage temperature is approximately 141° F., a safe temperature at the pH and mol ratio used to obtain a product of at least 40 A.I. (Reference is again made to the Kealy Patent No. 2,955,930, where the safe storage temperatures at various combinations of pH and mol ratio are set forth.) It can also be seen that the product is fairly stable after 2 days' curing, indicating that the normal curing time can be reduced if desired.

Table III gives the product analysis on the 12-day old fertilizer product made in accordance with this example.

TABLE III

| Moisture | Nitrogen | Available Phosphoric Acid | $K_2O$ | $NH_3N$ | Water-Insoluble Nitrogen | A.I. |
|---|---|---|---|---|---|---|
| 10.15 | 11.60 | 6.6 | 8.0 | 1.2 | 3.85 | 52 |

*Example II*

In this example a fertilizer containing an approximate $N—P_2O_5—K_2O$ analysis of 16–8–4 was prepared as follows:

| Solids— | Lbs./ton |
|---|---|
| Triple superphosphate (0–46–0) | 348 |
| Potassium nitrate (13.5–0–46) | 43 |
| Potassium sulfate (0–0–50) | 104 |
| Hydrated lime | 20 |
| Minor elements | 10 |
| Bulking agent (1.7–0–1.5) | 52.2 |
| Dye | .2 |

The above dry ingredients were scaled out separately batchwise on a timed cycle and then milled to pass an 8 mesh screen. After milling, the dry ingredients were blended by tumbling in a batch-type fertilizer mixer. The ingredients were then dumped into a surge hopper and fed therefrom at a steady rate by a controlled belt feeder to a rotary continuous tube mixer. As the stream of solids passes through the tube mixer 32 lbs./ton anhydrous ammonia (82.25–0–0) is proportioned into the solids, ammoniating the superphosphates and raising the over-all pH of the solids to a level of from 5.5 to 6.5. Ureaform solution (prepared by mixing 680 lbs./ton of an 82.5% urea solution (37.5–0–0) at 210° F. with 266 lbs./ton UF–85 (11.1–0–0)) is injected or sprayed in the rolling bed of solids in any convenient manner. We prefer to have the solution sprayed through multiple orifices to get maximum distribution throughout the substrate.

After the dry and liquid ingredients became thoroughly intermixed in the tube mixer, the combination of fertilizer ingredients was passed at 140° F. into a cooler where it tumbled until reaching a temperature of 80° F. The cooled product was placed in storage and after 10 days analyzed as follows:

TABLE IV

| | | |
|---|---|---|
| Total nitrogen—as N | percent | 15.80 |
| Available phosphoric acid—as $P_2O_5$ | do | 12.90 |
| Available potash—as $K_2O$ | do | 4.94 |
| Ammoniacal nitrogen | do | 1.15 |
| Nitrate nitrogen | do | 1.60 |
| Water-insoluble nitrogen | do | 3.00 |
| Availability index | do | 41.7 |
| Chloride content—as Cl | do | 0.49 |
| Free urea | do | 2.42 |
| pH | | 5.4 |

Bulk density 36.4 lbs./cu. ft.

*Example III*

The following mixture of ingredients was compounded to prepare a nonburning free-flowing mixed fertilizer:

| Ingredient— | lbs./ton |
|---|---|
| Triple superphosphate | 229 |
| Potassium nitrate | 43 |
| Potassium sulfate | 200 |
| Anhydrous ammonia | 17.4 |
| Calcium hydroxide | 20 |
| Minor elements | 10 |
| Soyabean hull meal | 775 |
| Urea | 420 |
| UF–85 | 204 |
| Water | 105 |
| Dye | .5 |

The solids were prepared as outlined in Example II. The pH of the acidic substrate so formed was 5.5 The urea and water were mixed to prepare a concentrated urea solution. The solution was thoroughly mixed with the UF–85 and after reacting together for one minute the urea-form solution so formed was passed through 3 Helioflow units each having 20 sq. ft. heating surface. The urea-form solution was cooled to the extent that it was incorporated into the acidic substrate at 96° F. The fertilizer ingredients excited the mixer and went into storage at 95°–100° F. The temperature of the pile rose to 150° F. and analyzed as follows:

TABLE V

| | | |
|---|---|---|
| Water-insoluble nitrogen | | 8.40 |
| Availability index | | 60 |
| Free urea | percent | .8 |
| Total nitrogen | | 11.45 |

Obviously, many modifications and variations of the invention as hereinbefore set forth may be made without departing from the spirit and scope thereof and therefore only such limitations should be imposed as are indicated in the appended claims.

We claim:

1. The method of preparing a free-flowing, mixed fertilizer composition, which comprises: introducing an aqueous solution of urea and formaldehyde, in proportions substantially as desired in the final product, into substantially dry acidic fertilizer solids, said solution having been cooled to a temperature between about 30° F. and 160° F. and having a urea-formaldehyde mol ratio of about 1–2.75:1, a pH above about 6.0, and containing sufficient water to solubilize the urea; and allowing said solution to react while in contact with said fertilizer solids whereby to form a free-flowing mixed fertilizer composition containing water insoluble urea-formaldehyde condensation products having an availability index of at least about 40 and a maximum of about 10% uncombined urea.

2. The method of preparing a free-flowing mixed fertilizer composition, which comprises: introducing a solution consisting essentially of water and urea and formaldehyde, in proportions substantially as desired in the final product, into substantially dry acidic fertilizer solids, said solution having been cooled to a temperature of between about 30° F. and 160° F. and having a urea-formaldehyde mol ratio of about 1–2.75:1, a pH of between about 6–7.2, and being substantially free from water-insoluble urea-formaldehyde polymers; and allowing said solution to react while in contact with said fertilizer solids whereby to form a free-flowing mixed fertilizer composition containing water-insoluble urea-formaldehyde condensation products having an availability index of at least about 40 and a maximum of about 10% uncombined urea.

3. The method of preparing a free-flowing, mixed fertilizer composition, which comprises: introducing a solution consisting essentially of water and urea and formaldehyde, in proportions substantially as desired in the final product, into substantially dry acidic fertilizer solids, said solution having been cooled to between about 30° F. and 160° F. and having a urea-formaldehyde mol ratio of about 1–2.75:1, a pH of between about 6–7.2 and containing about 10–25% water by weight, and being substantially free from water-insoluble urea-formaldehyde polymers; and allowing said solution to react while in contact with said fertilizer solids whereby to form a free-flowing mixed fertilizer composition containing water-insoluble urea-formaldehyde condensation products having an availability index of at least about 40 and a maximum of about 10% uncombined urea.

4. The method of preparing a free-flowing, mixed fertilizer composition, which comprises: introducing a solution consisting essentially of water and urea and formaldehyde, in proportions substantially as desired in the final product, into substantially dry acidic fertilizer solids having a pH between about 3.0 and 6.5, said solution having been cooled to between about 30° F. to 160° F. and having a urea-formaldehyde mol ratio of about 1–2.75:1, a pH of between about 6 and 7.2 and containing about 10–25% water by weight, and being substantially free from water-insoluble urea-formaldehyde polymers; allowing said solution to react while in contact with said fertilizer solids to form free-flowing mixed fertilizer; and maintaining the temperature of said mixed fertilizer below about 164° F. whereby to form a free-flowing, mixed fertilizer composition containing water-insoluble urea-formaldehyde condensation products having an availability index of at least about 40 and a maximum of about 10% uncombined urea.

5. The method of preparing a free-flowing, mixed fertilizer, which comprises: mixing aqueous urea, said aqueous urea having a temperature above the temperature at which the urea will crystallize out, with a formaldehyde source selected from the group consisting of aqueous formaldehyde and an aqueous mixture of formaldehyde and urea, said aqueous urea and said formaldehyde source having a ratio substantially as desired in the final product and being mixed in proportions so as to form a solution having a urea-formaldehyde mol ratio of 1–2.75:1, said solution having a pH of between about 6.0 to 7.2, a temperature between about 160° F. and 250° F. and containing about 10–25% water, and being substantially free from water-insoluble urea-formaldehyde polymers; cooling the temperature of said solution to between about 30° F. and 160° F.; and reacting said solution in admixture with acidic fertilizer solids whereby to form a free-flowing mixed fertilizer containing water-insoluble urea-formaldehyde condensation products having an availability index of at least about 40 and a maximum of about 10% uncombined urea.

6. In the preparation of a free-flowing, mixed fertilizer wherein water-insoluble urea-formaldehyde condensation products are produced in admixture with substantially dry, acidic fertilizer solids having a pH between about 3.0 and 6.5 and a maximum of about 10% uncombined urea, the improvement comprising: mixing aqueous urea, containing 75–95% urea by weight and having a temperature above that at which the urea will crystallize out, with a formaldehyde source comprising a solution of formaldehyde, urea and water, said aqueous urea and said formaldehyde source having a ratio substantially as desired in the final product and being mixed in proportions such that the mol ratio of urea to formaldehyde in the mixture will be between about 1–2.75:1, reacting the so-formed mixtures for at least 30 seconds to form a urea-formaldehyde solution having a pH of about 6.0 to 7.2, a temperature between about 160° F. and 250° F.; and thereafter cooling said urea-formaldehyde solution to a temperature of between about 30° F. and 160° F.

7. The method of preparing a free-flowing, mixed fertilizer, which comprises: mixing a concentrated aqueous urea solution, containing 75–95% urea by weight and having a temperature of between 160° F. to 245° F., with a source of formaldehyde selected from the group consisting of aqueous formaldehyde and an aqueous mixture of urea and formaldehyde, said source of formaldehyde having a temperature of between about 40° F. to 140° F., said aqueous urea solution and said source of formaldehyde being mixed in proportions substantially as desired in the final product such that the mol ratio of urea to formaldehyde will be between about 1:1 and 2.75:1; reacting the so-formed mixture for at least 30 seconds to form a urea-formaldehyde solution having a pH of between about 6.0 and 7.2, a water content of between 10 to 25%, and a temperature between about 160° F. and 250° F.; cooling the temperature of the said urea-formaldehyde solution to between about 30° F. and 160° F.; and mixing said urea-formaldehyde solution with substantially dry acidic fertilizer solids having a pH between about 3.0 and 6.5 whereby to produce a free-flowing mixed fertilizer containing substantial amounts of water-insoluble urea-formaldehyde condensation products having an availability index above about 40 and a maximum of about 10% uncombined urea.

8. In the preparation of mixed fertilizers containing water-insoluble urea-formaldehyde condensation products and substantially dry fertilizer constituents, said fertilizers containing a maximum of about 10% uncombined urea, the improvement comprising: preparing a mixture of urea and formaldehyde in proportions substantially as desired in the final product to be thereafter added to substantially dry acidic fertilizer solids, said mixture being prepared by mixing aqueous urea having a temperature of between 160° F. and 245° F. with a source of formaldehyde comprising a concentrated methylol urea solution having a formaldehyde-urea mol ratio of greater than 1, said aqueous urea and said source of formaldehyde being mixed in such proportions so as to form a urea-formaldehyde mol ratio of between about 1:1 and 2.75:1; reacting the so-formed mixture for a period of time sufficient to form a urea-formaldehyde solution but insufficient to form water-insoluble urea-formaldehyde condensation products, said urea-formaldehyde solution having a pH of about 6.0 and 7.2, a temperature of between about 160° F. to 250° F., and containing 10–25% water; and thereafter cooling said urea-formaldehyde solution to a temperature of between about 30° F. to 100° F.

References Cited in the file of this patent

UNITED STATES PATENTS

| | | |
|---|---|---|
| 2,255,027 | Keenen et al. | Sept. 2, 1941 |
| 2,415,705 | Rohner et al. | Feb. 11, 1947 |
| 2,592,809 | Kralovec et al. | Apr. 15, 1952 |
| 2,618,546 | Davenport | Nov. 18, 1952 |
| 2,766,283 | Darden | Oct. 9, 1956 |
| 2,810,710 | Long | Oct. 22, 1957 |
| 2,864,685 | Waters et al. | Dec. 16, 1958 |
| 2,955,930 | Kealy | Oct. 11, 1960 |

FOREIGN PATENTS

| | | |
|---|---|---|
| 539,596 | Canada | Apr. 16, 1957 |

OTHER REFERENCES

Winsor et al.: "Journal of the Science of Food and Agriculture," vol. 9, April 1958, pages 185 to 194. (Copy in Library.)